(12) United States Patent
Tojo et al.

(10) Patent No.: US 11,656,812 B2
(45) Date of Patent: May 23, 2023

(54) IMAGE FORMING APPARATUS, IMAGE FORMING METHOD, AND NON-TRANSITORY COMPUTER READABLE MEDIUM STORING IMAGE FORMING PROGRAM FOR REDUCING INCONVENIENCE OF PRINTING WITH INCONSISTENT SETTING OF RECORDING MEDIUM

(71) Applicant: FUJIFILM Business Innovation Corp., Tokyo (JP)

(72) Inventors: Hiroyuki Tojo, Kanagawa (JP); Takayuki Saito, Kanagawa (JP); Makoto Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/525,983

(22) Filed: Nov. 15, 2021

(65) Prior Publication Data

US 2022/0413773 A1    Dec. 29, 2022

(30) Foreign Application Priority Data

Jun. 24, 2021    (JP) .............................. JP2021-104873

(51) Int. Cl.
*G06F 3/12* (2006.01)
*H04N 1/00* (2006.01)

(52) U.S. Cl.
CPC ............ *G06F 3/121* (2013.01); *G06F 3/1234* (2013.01); *G06F 3/1255* (2013.01); *H04N 1/00039* (2013.01); *H04N 1/00076* (2013.01); *H04N 1/00092* (2013.01); *H04N 1/00716* (2013.01); *H04N 1/00724* (2013.01)

(58) Field of Classification Search
None
See application file for complete search history.

(56) References Cited

U.S. PATENT DOCUMENTS

2012/0002223 A1\*    1/2012    Tanaka ..................... B41J 11/00
358/1.9

FOREIGN PATENT DOCUMENTS

| JP | 2005144927 | | 6/2005 |
|---|---|---|---|
| JP | 2006337410 | | 12/2006 |
| JP | 2006337410 | A  * | 12/2006 |
| JP | 2019151041 | | 9/2019 |

\* cited by examiner

*Primary Examiner* — Andrew H Lam
(74) *Attorney, Agent, or Firm* — JCIPRNET

(57) ABSTRACT

An image forming apparatus includes a recording medium accommodation portion that accommodates a recording medium, a storage portion that stores information about the recording medium that is accommodated in the recording medium accommodation portion and previously printed, a sensing portion that senses opening and closing of the recording medium accommodation portion, a comparison portion that compares currently set setting information about the recording medium with the information about the recording medium stored in the storage portion on a condition that the sensing portion senses that the recording medium accommodation portion is not open between previous printing and current printing, and an output portion that outputs a comparison result of the comparison portion.

20 Claims, 9 Drawing Sheets

IMAGE FORMING APPARATUS, IMAGE FORMING METHOD, AND NON-TRANSITORY COMPUTER READABLE MEDIUM STORING IMAGE FORMING PROGRAM FOR REDUCING INCONVENIENCE OF PRINTING WITH INCONSISTENT SETTING OF RECORDING MEDIUM

CROSS-REFERENCE TO RELATED APPLICATIONS

This application is based on and claims priority under 35 USC 119 from Japanese Patent Application No. 2021-104873 filed Jun. 24, 2021.

BACKGROUND

(i) Technical Field

The present invention relates to an image forming apparatus, an image forming method, and a non-transitory computer readable medium storing an image forming program.

(ii) Related Art

JP2006-337410A discloses an image forming apparatus including a setting section that sets paper information for each paper feeding tray, a reception section that receives a printing job, and a control section that controls a printing process in accordance with the paper information. In a case where both of a paper feeding tray and paper information are designated in the printing job received by the reception section, the control section controls the printing process in accordance with the paper information designated in the current printing job regardless of the paper information set by the setting section.

JP2019-151041A discloses an image forming apparatus including a paper feeding tray that stores a sheet on which an image is printed, a detection section that detects a status of the paper feeding tray each time the paper feeding tray is closed, a decision section that decides whether or not a determination of a type of the sheet stored in the paper feeding tray is necessary, based on the status detected by the detection section in a case where the paper feeding tray is currently closed, and the status detected in a case where the paper feeding tray is previously closed, and a determination section that determines the type in a case where the decision section decides that the determination of the type is necessary.

JP2005-144927A discloses an image forming apparatus including an image reading section that reads image data of an original document, an image storage section that stores the read image data, an image forming section that performs image forming, and a plurality of paper trays. The image forming apparatus performs the image forming of the stored image data on paper discharged from any paper tray selected in accordance with an instruction from a control portion. The image forming apparatus includes a reserved job setting section that sets a reserved job, a paper information input section that inputs paper information about paper for each paper tray, a paper information storage section that stores the paper information before and after changing paper information setting of the paper trays, and a tray insertion and retraction sensing section that senses insertion and retraction of the paper trays. In a case where the tray insertion and retraction sensing section senses that the paper trays are not retracted or inserted after the paper information setting is changed, the control portion displays a message prompting paper check or paper replacement at a start of the reserved job.

SUMMARY

Aspects of non-limiting embodiments of the present disclosure relate to an image forming apparatus, an image forming method, and a non-transitory computer readable medium storing an image forming program that can reduce inconvenience of printing with inconsistent setting of a recording medium, compared to a case where opening and closing of a recording medium accommodation portion performed between previous printing and current printing are not considered.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a recording medium accommodation portion that accommodates a recording medium, a storage portion that stores information about the recording medium that is accommodated in the recording medium accommodation portion and previously printed, a sensing portion that senses opening and closing of the recording medium accommodation portion, a comparison portion that compares currently set setting information about the recording medium with the information about the recording medium stored in the storage portion on a condition that the sensing portion senses that the recording medium accommodation portion is not open between previous printing and current printing, and an output portion that outputs a comparison result of the comparison portion.

BRIEF DESCRIPTION OF THE DRAWINGS

Exemplary embodiment(s) of the present invention will be described in detail based on the following figures, wherein.

DETAILED DESCRIPTION

Hereinafter, each exemplary embodiment of the present invention will be described with reference to the drawings. Each exemplary embodiment below illustrates an image forming apparatus for embodying a technical idea of the present invention and is not intended to specify the present invention. Each exemplary embodiment below is equally applicable to other exemplary embodiments included in the claims.

Figure 1:
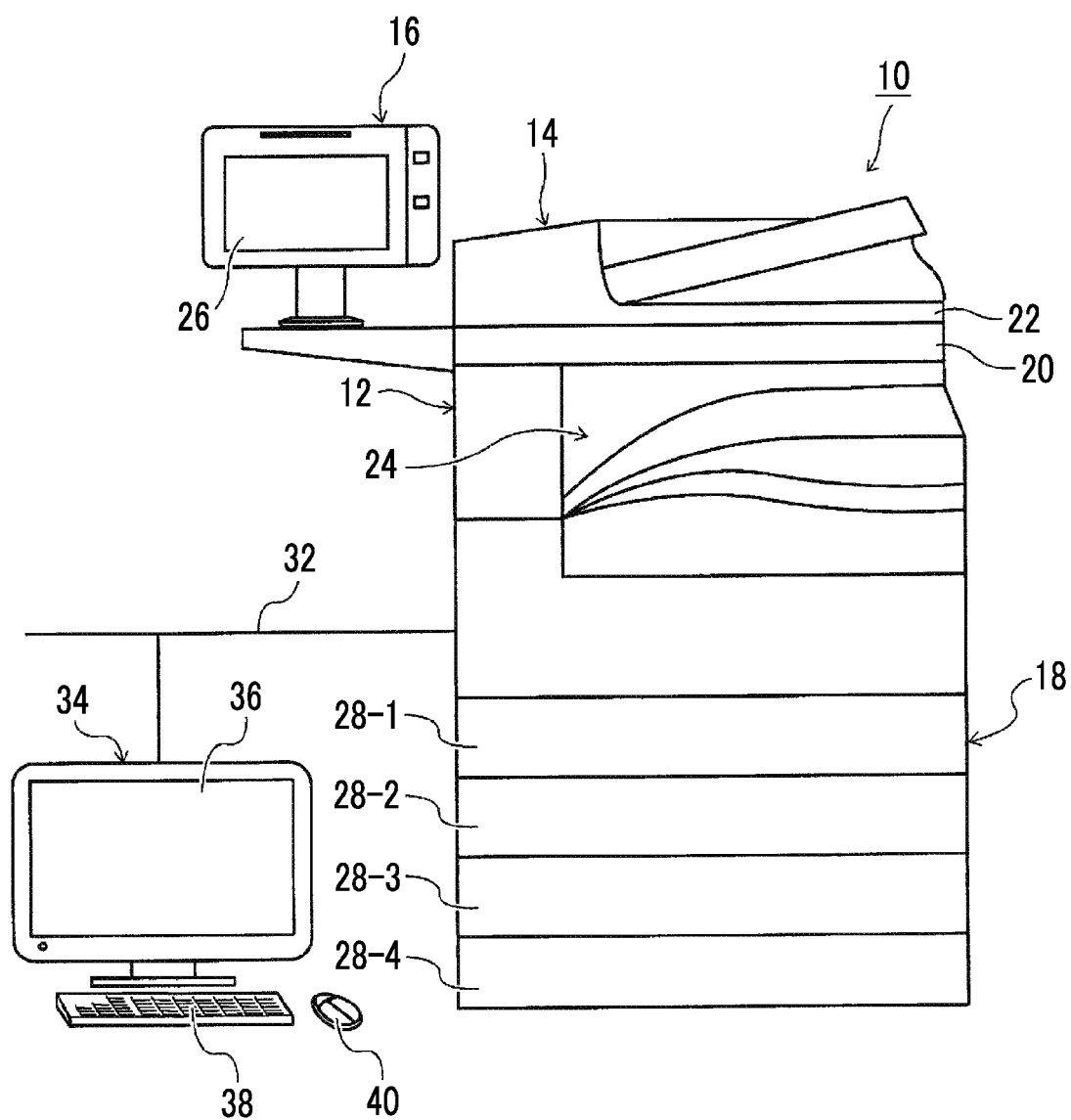
FIG. 1 is an exterior view illustrating an image forming apparatus according to an exemplary embodiment.
Figure 2:
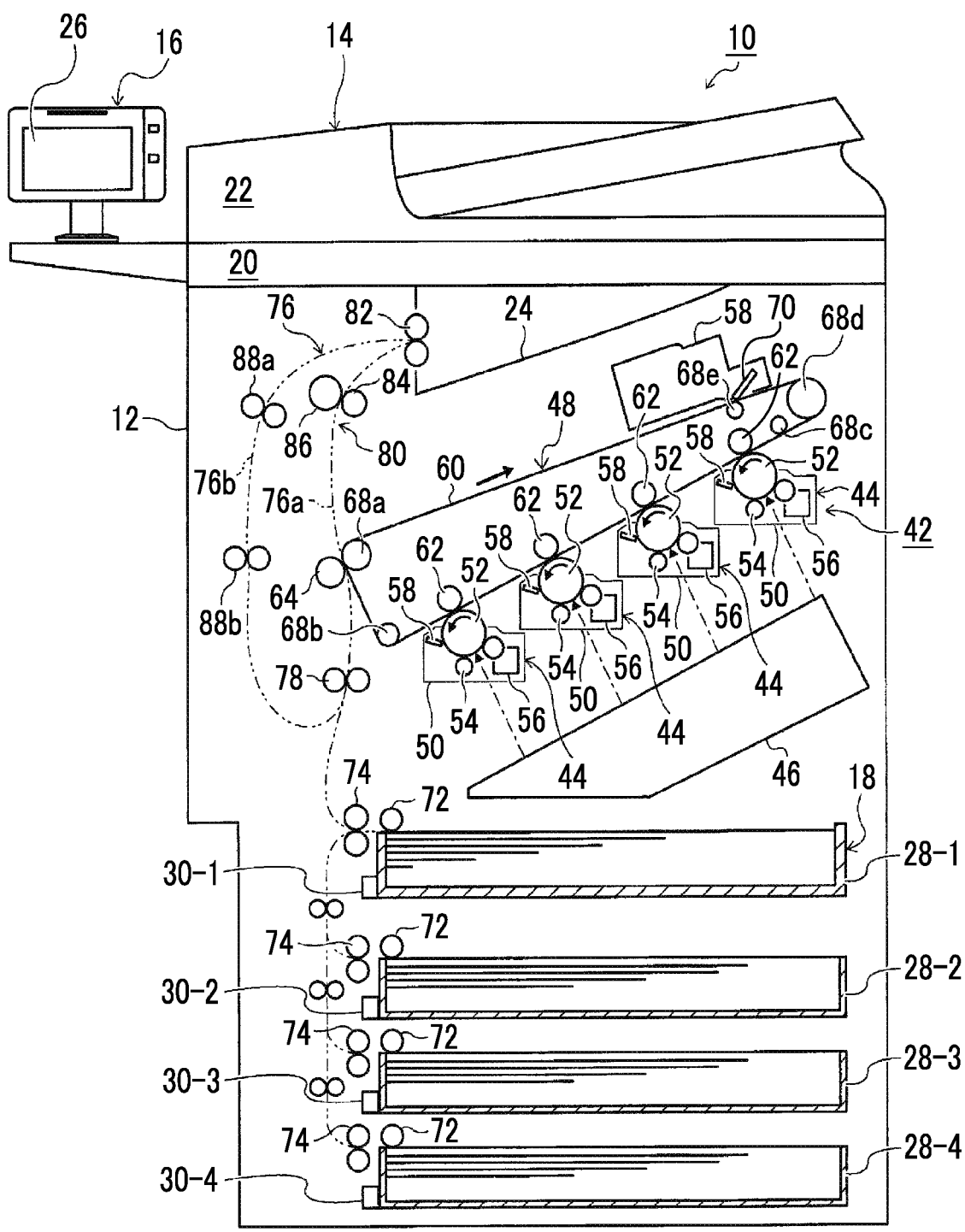
FIG. 2 is a cross-sectional view illustrating the image forming apparatus according to the exemplary embodiment.

FIG. 1 and FIG. 2 illustrate an image forming apparatus 10 according to an exemplary embodiment of the present invention. The image forming apparatus 10 includes an image forming apparatus main body 12. On an upper portion side of the image forming apparatus main body 12, that is, on an opposite side from a floor surface or the like on which the image forming apparatus 10 is arranged, the image forming apparatus 10 includes an original document reading device 14 that reads an image or the like, and a display and operation device 16 on which various operations and display are performed as a user interface (UI). In addition, a recording medium accommodation device 18 is arranged in a lower portion of the image forming apparatus main body 12.

The original document reading device 14 includes an original document reading device main body 20 and an original document transport device 22 as an opening and closing body of which one end is rotatably supported and the other end is openably and closably provided with respect to the original document reading device main body 20. In addition, the original document reading device 14 is arranged above the image forming apparatus main body 12 such that a space is provided between the original document reading device 14 and a discharge portion 24. The original document reading device 14 reads an original document that is transported or arranged between the original document reading device main body 20 and the original document transport device 22.

The display and operation device 16 includes a display and operation portion 26. The display and operation portion 26 is configured by combining, for example, a touch panel with a liquid crystal display portion. On the display and operation portion 26, setting information for operating the image forming apparatus is input, or a setting state of the image forming apparatus is displayed.

The recording medium accommodation device 18 includes, for example, recording medium accommodation portions 28-1, 28-2, 28-3, and 28-4 that are stacked in four stages. In the drawing, the recording medium accommodation portions may be simply displayed as accommodation portions. In addition, the recording medium accommodation portions may be referred to as recording medium accommodation portions 28 unless otherwise distinguished. Each recording medium accommodation portion 28 accommodates recording media in stack. Each recording medium accommodation portion 28 is openable and closable with respect to the image forming apparatus main body 12, and enables the accommodated recording media to be supplied or enables types of accommodated recording media, for example, a size, a thickness, a color, and a paper quality, or an accommodation direction to be changed. In addition, as illustrated in FIG. 2, sensing portions 30-1, 30-2, 30-3, and 30-4 that sense opening and closing of the recording medium accommodation portions 28, respectively, are provided in the recording medium accommodation portions 28. The sensing portions may be referred to as sensing portions 30 unless otherwise distinguished.

The size of the recording media accommodated in the recording medium accommodation portions 28 can be sensed in a case where the size is a standard size. In a case where the size is a non-standard size, the size cannot be sensed.

In addition, the image forming apparatus 10 is connected to a terminal apparatus 34 such as a personal computer via a network 32. The terminal apparatus 34 includes, for example, a display device 36 and a keyboard 38 and a mouse 40 that are input devices. The terminal apparatus 34 transmits a document created by the terminal apparatus 34 to the image forming apparatus 10 or performs setting related to image forming performed by the image forming apparatus 10.

As illustrated in FIG. 2, an image forming portion 42 is arranged in the image forming apparatus main body 12. The image forming portion 42 includes, for example, image forming units 44 corresponding to four colors of yellow (Y), magenta (M), cyan (C), and black (K), an optical writing device 46, and a transfer device 48. The image forming units 44 and the constituents thereof have the same configuration except for a color of an image to be formed.

The image forming units 44 are, for example, of an electrophotographic type that forms a color image. Each image forming unit 44 includes an image forming unit main body 50. In the image forming unit main body 50, an image carrier 52 of a drum shape that carries a developer image, an electrostatic charging device 54 as an electrostatic charging section including an electrostatic charging roll that electrostatically charges the image carrier 52 uniformly, a developing device 56 that develops a latent image written on the image carrier 52 using a developer (toner), and a cleaning device 58 that cleans a waste developer remaining on the image carrier 52 by, for example, scraping.

The developing devices 56 develop the latent image formed on the corresponding image carriers 52 using developers of Y, M, C, and K accommodated in the developing devices 56, respectively.

In addition, the optical writing device 46 is used as a latent image forming device, consists of, for example, a laser exposure device of a scanning type, and forms the latent image on a surface of each image carrier 52. As another example, an LED, a surface-emitting laser, or the like can be used as the optical writing device 46.

The transfer device 48 is configured with a transfer target member 60 used as an intermediate transfer body, primary transfer rolls 62 used as a primary transfer device, a secondary transfer roll 64 used as a secondary transfer device, and a cleaning device 66.

The transfer target member 60 has, for example, an endless belt shape and is supported by five support rolls 68a, 68b, 68c, 68d, and 68e to be rotatable in a direction illustrated by an arrow in FIG. 2. In addition, at least one of the support roll 68a, 68b, 68c, 68d, or 68e is connected to a power source (not illustrated) such as a motor. The transfer target member 60 is rotationally driven by rotating the support rolls 68*a*, 68*b*, 68*c*, 68*d*, and 68*e* by receiving driving power transmitted from the power source.

The support roll 68*a* is arranged to face the secondary transfer roll 64 and functions as a backup roll of the secondary transfer roll 64. A part interposed between the secondary transfer roll 64 and the support roll 68*a* is a secondary transfer position.

Each primary transfer roll 62 transfers the developer image formed on the surface of the image carrier 52 by the corresponding developing device 56 to the transfer target member 60.

In addition, the secondary transfer roll 64 transfers the developer images of Y, M, C, and K transferred to the transfer target member 60 to a recording medium.

The cleaning device 58 includes a scraping member 70 that scrapes the developer of each color remaining on a surface of the transfer target member 60 after the developer image of each color is transferred to the recording medium by the secondary transfer roll 64. The developer scraped by the scraping member 70 is collected into a main body of the cleaning device 58.

A forwarding roll 72 that forwards the uppermost recording medium is provided in each recording medium accommodation portion 28. The recording media forwarded by the forwarding rolls 72 are transported to a transport path 76 by transport rolls 74.

The transport path 76 is configured with a main transport path 76*a* and a reverse transport path 76*b*.

The main transport path 76*a* transports the recording medium supplied from any recording medium accommodation portion 28 to the image forming portion 42 and discharges the recording medium on which the image is formed to the discharge portion 24. On the main transport path 76*a*, the transport rolls 74, resist rolls 78, the transfer device 48, a fixing device 80, and discharge rolls 82 are arranged in order from an upstream side of a transport direction of the recording medium.

The resist rolls 78 temporarily stop a leading edge portion of the recording medium transported from the recording medium accommodation device 18 side and forward the recording medium toward the transfer device 48 in accordance with a timing of the image forming.

The fixing device 80 includes a heating roll 84 and a pressure application portion 86 and fixes the developer image on the recording medium by heating and applying pressure to the recording medium that passes between the heating roll 84 and the pressure application portion 86.

The discharge rolls 82 discharge the recording medium on which the developer is fixed by the fixing device 80 to the discharge portion 24.

In addition, the reverse transport path 76*b* is a transport path for reversing the recording medium of which the developer image is formed on one surface, and supplying the recording medium toward the image forming portion 42 again. For example, two pairs of reverse transport rolls 88*a* and 88*b* are arranged on the reverse transport path 76*b*.

The recording medium is supplied to the reverse transport path 76*b* by transporting the recording medium to the discharge rolls 82 from the main transport path 76*a* and counter rotating the discharge rolls 82 in a state where a trailing edge portion of the recording medium is sandwiched between the discharge rolls 82. The recording medium supplied to the reverse transport path 76*b* is transported to a position upstream of the resist rolls 78 by the reverse transport rolls 88*a* and 88*b*.

Figure 3:
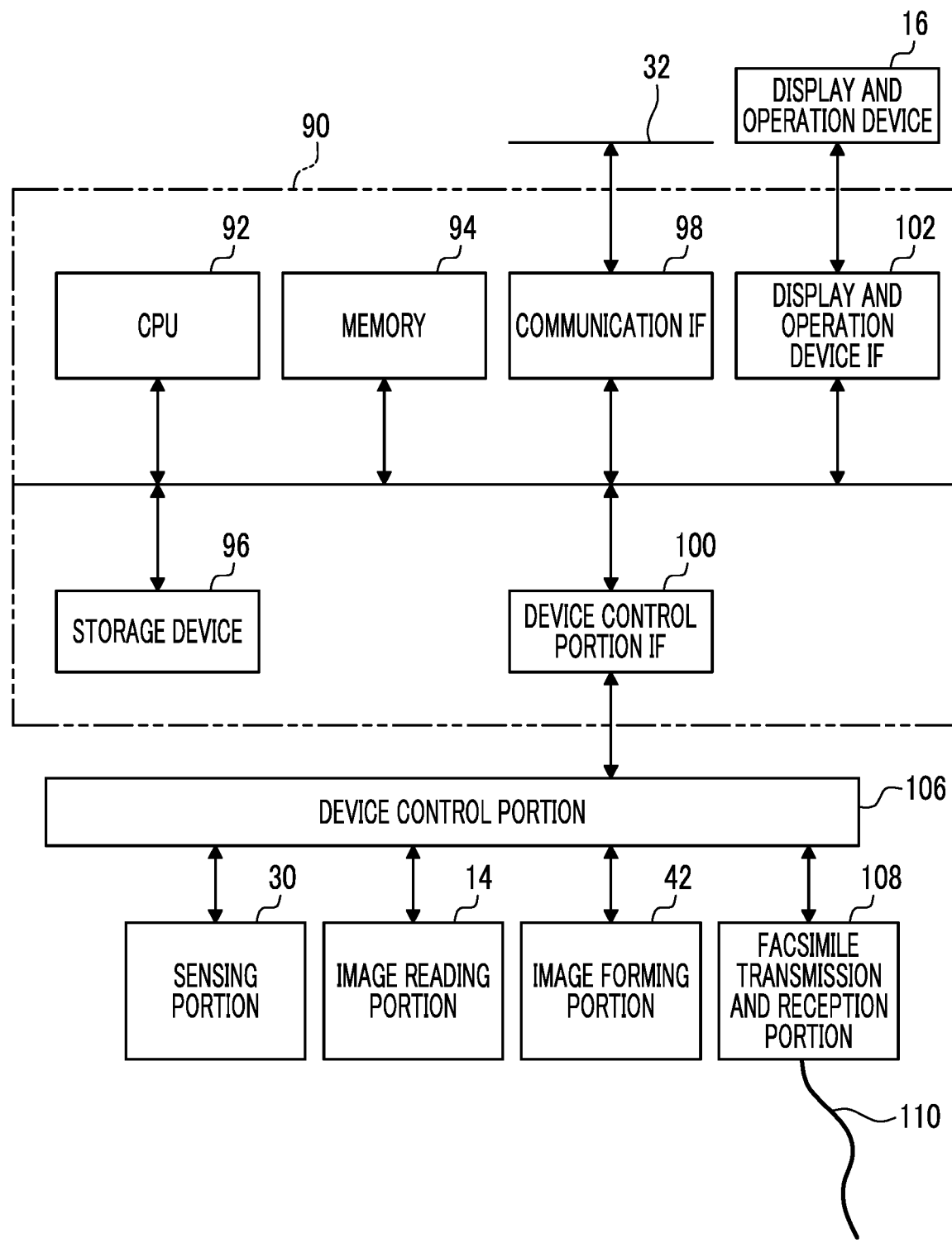
FIG. 3 is a block diagram illustrating a main control portion used in the image forming apparatus according to the exemplary embodiment.

FIG. 3 illustrates a block diagram illustrating hardware of the image forming apparatus 10.

The image forming apparatus 10 includes a main control portion 90. The main control portion 90 includes a CPU 92 that is a processor, a memory 94, a storage device 96, a communication interface 98, a device control portion interface 100, and a display and operation device interface 102. The CPU 92, the memory 94, the storage device 96, the communication interface 98, the device control portion interface 100, and the display and operation device interface 102 are connected via a bus 104.

The CPU 92 executes a predetermined process based on a control program stored in the memory 94. The storage device 96 is configured with, for example, a hard disk and stores necessary software and data. The communication interface 98 is connected to the network 32 and inputs and outputs data via the network 32.

A device control portion 106 is connected to the device control portion interface 100. The device control portion 106 controls the original document reading device 14, the image forming portion 42, and a facsimile transmission and reception portion 108. A telephone line 110 is connected to the facsimile transmission and reception portion 108. In addition, the display and operation device is connected to the display and operation device interface 102. Furthermore, the device control portion 106 receives sensing signals from the sensing portions 30.

Next, an operation example of the CPU 92 will be described.

Figure 4:
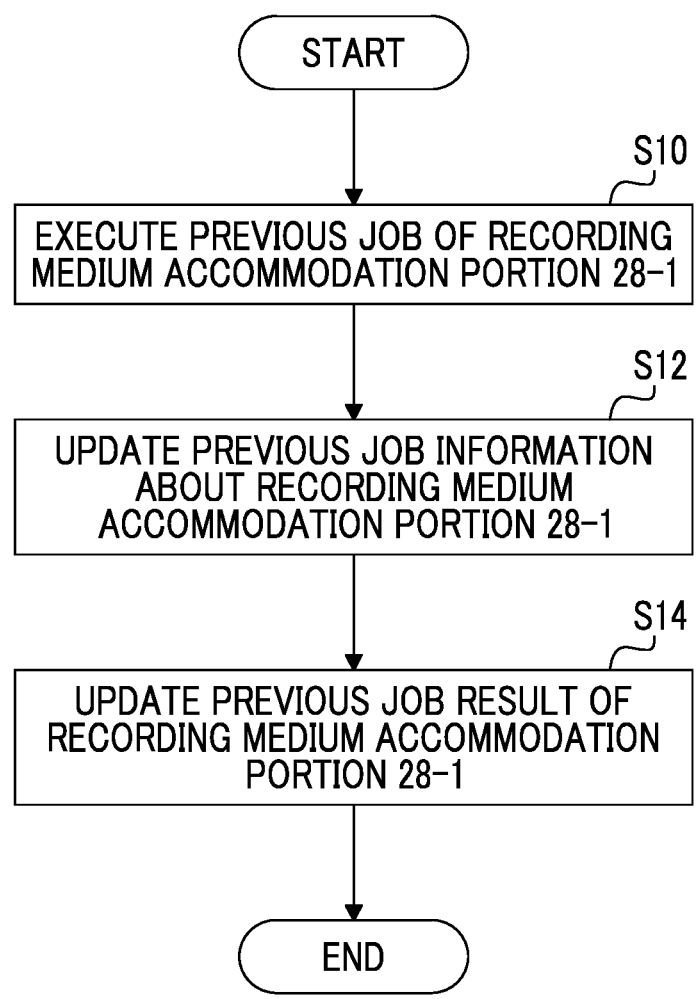
FIG. 4 is a flowchart illustrating a flow of operation in a case of maintaining information about a job using a recording medium accommodated in an accommodation portion of the image forming apparatus according to the exemplary embodiment.

FIG. 4 illustrates a flowchart in a case of maintaining information about a job using the recording medium accommodated in the recording medium accommodation portion 28-1.

The job refers to a series of processes for executing one function. The job applied in the exemplary embodiment includes a printing job, a copying job, and a facsimile reception job.

First, in step S10, an assumption that a previous job using the recording medium of the recording medium accommodation portion 28-1 is executed is made. In next step S12, previous job information about the recording medium accommodation portion 28-1 is updated. The job information includes the size, the thickness, the color, the paper quality, the accommodation direction, and the like, set by the terminal apparatus 34 or the display and operation device 16, of the recording medium accommodated in the recording medium accommodation portion 28-1. In step S12, the information about the job is updated regardless of an execution result of the previous job. The updated job information is stored in, for example, the storage device 96.

In next step S14, a previous job result of the recording medium accommodation portion 28-1 is updated. The job result indicates whether or not the job is completed as intended by a user. For example, in a case where the size of the recording medium set by the terminal apparatus 34 or the display and operation device 16 is different from the size of the recording medium accommodated in the recording medium accommodation portion 28-1, a paper jam occurs, and the job result is updated as a result "paper jam". In addition, in a case where the thickness or the accommodation direction of the recording medium is different, there is also a concern of the paper jam. Even in a case where the paper jam does not occur, for example, a case where a recording medium different from the recording medium of the color intended by the user is printed is included by providing a color sensor in, for example, the discharge portion 24 or the transport path 76. Furthermore, in a case where other characteristics of the recording medium are different, the user may input "successful" or "unsuccessful".

The previous job result updated in step S14 is stored in, for example, the storage device 96.

The job information is acquired and stored for not only the recording medium accommodation portion 28-1 but also the other recording medium accommodation portions 28-2, 28-3, and 28-4.

Figure 5:
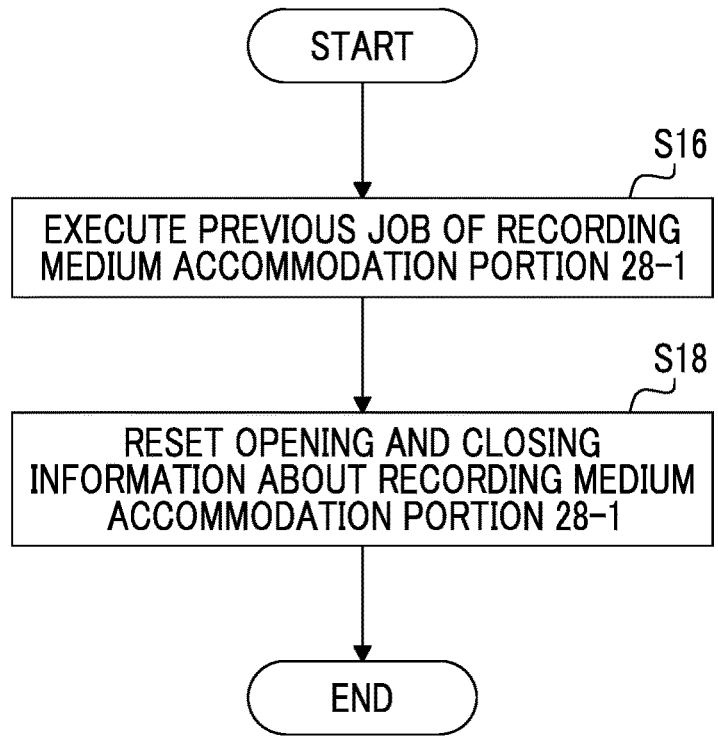
FIG. 5 is a flowchart illustrating a flow of operation in a case of resetting opening and closing information about the accommodation portion of the image forming apparatus according to the exemplary embodiment.
Figure 6:
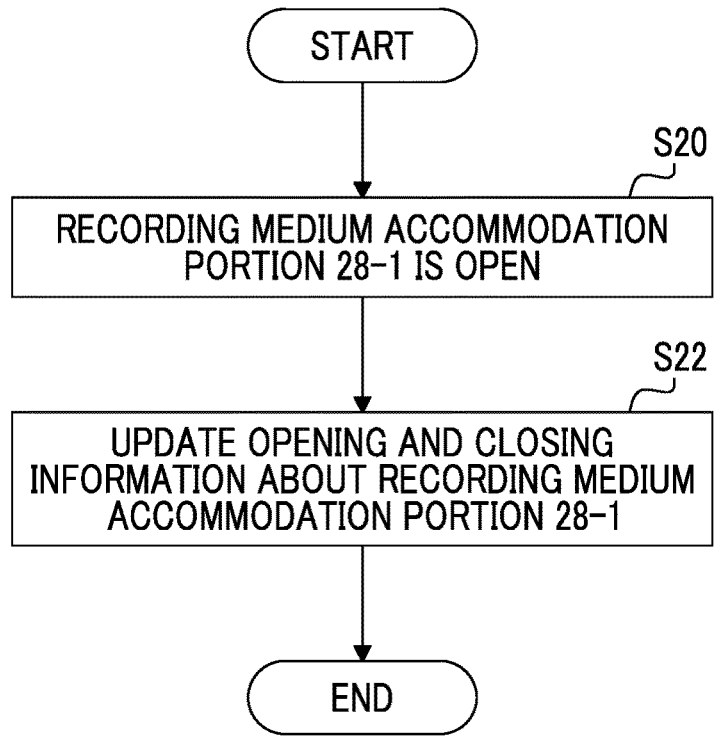
FIG. 6 is a flowchart illustrating a flow of operation in a case of updating the opening and closing information about the accommodation portion of the image forming apparatus according to the exemplary embodiment.

FIG. 5 and FIG. 6 illustrate flowcharts related to opening and closing of the recording medium accommodation portion 28-1.

That is, as illustrated in FIG. 5, in step S16, in a case where the job is executed for the recording medium accommodation portion 28-1, opening and closing information about the recording medium accommodation portion 28-1 is reset in next step S18. Meanwhile, as illustrated in FIG. 6, in step S20, in a case where a determination that the recording medium accommodation portion 28-1 is open is made based on the signal from the sensing portion 30-1, the opening and closing information about the recording medium accommodation portion 28-1 is updated in next step S22. The opening and closing information about the recording medium accommodation portion 28-1 is stored in, for example, the storage device 96.

The opening and closing information is maintained for not only the recording medium accommodation portion 28-1 but also the other recording medium accommodation portions 28-2, 28-3, and 28-4.

Figure 7:
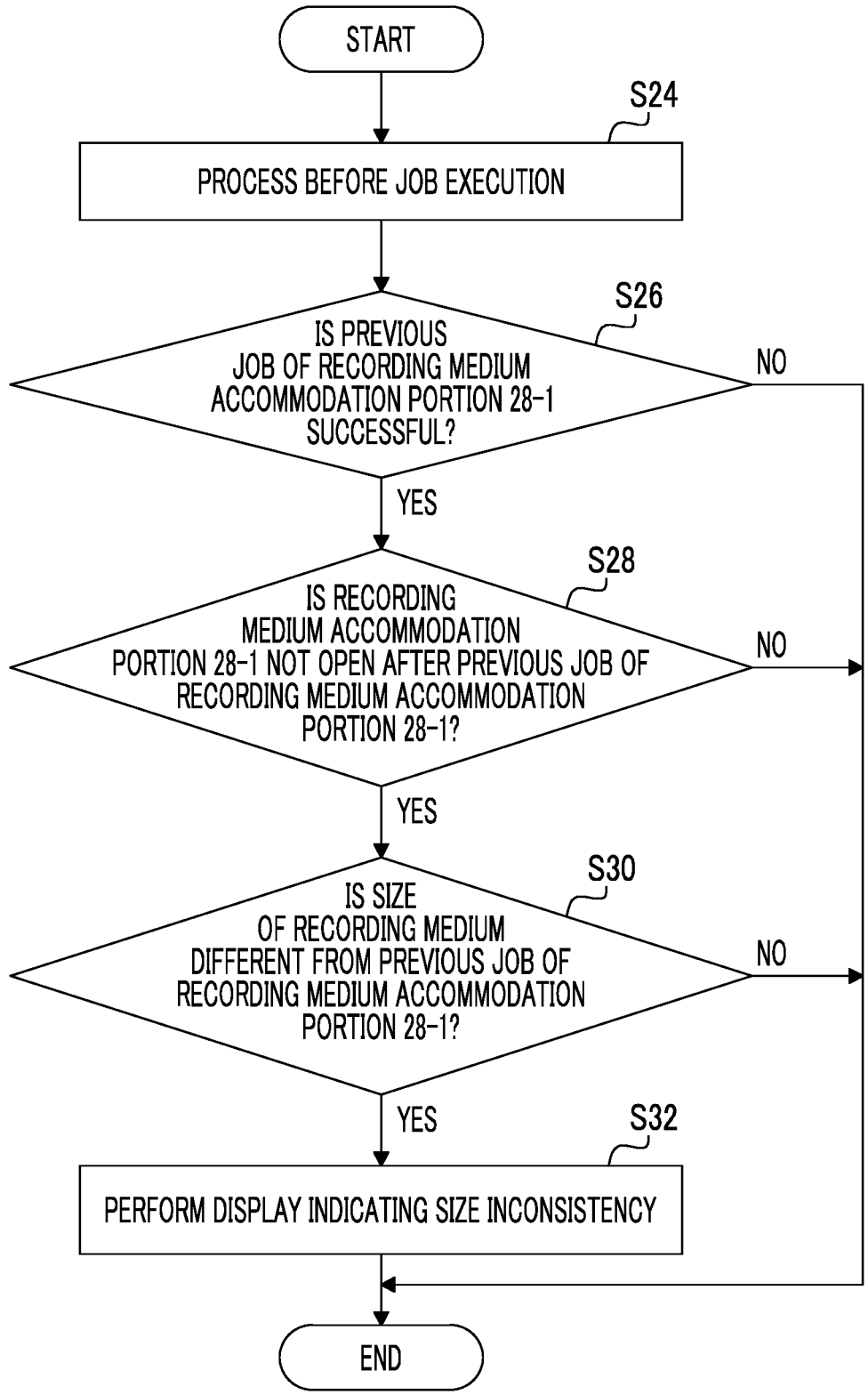
FIG. 7 is a flowchart illustrating a flow of operation in a case of issuing an alert before job execution in the image forming apparatus according to the exemplary embodiment.

FIG. 7 illustrates a flowchart in a case of issuing an alert before job execution.

In step S24, in a case where a process before job execution is performed, first, a determination as to whether or not the previous job of the recording medium accommodation portion 28-1 is successful is performed in step S26. This determination is performed by referring to information about the previous result that is updated in step S14 and stored in the storage device 96.

The process before job execution is a process before actual execution of the job and is in a state where the recording medium is not supplied yet. The process before job execution may be in a state after reception of the job by the image forming apparatus 10 and before a start of the job or may be in a state before reception of the job by the image forming apparatus 10. In addition, while the process in the image forming apparatus 10 is described in the exemplary embodiment, a state of setting the image forming apparatus 10 before transmitting the job in the terminal apparatus 34 may be applied as another exemplary embodiment.

In step S26, in a case where a determination that the previous job of the recording medium accommodation portion 28-1 is not successful, that is, unsuccessful, is made, the process is finished. Meanwhile, in step S26, in a case where a determination that the previous job of the recording medium accommodation portion 28-1 is successful is made, a transition is made to step S28.

In step S28, a determination as to whether or not the recording medium accommodation portion 28-1 is not open after the previous job of the recording medium accommodation portion 28-1 is performed. The determination of opening and closing of the recording medium accommodation portion 28-1 is performed by referring to the opening and closing information of the storage device 96 stored in steps S18 and S22. In step S28, in a case where a determination that the recording medium accommodation portion 28-1 is open after the previous job is made, the process is finished. Meanwhile, in step S28, in a case where a determination that the recording medium accommodation portion 28-1 is not open after the previous job is made, a transition is made to step S30.

In step S30, a determination as to whether or not the currently set size of the recording medium accommodated in the recording medium accommodation portion 28-1 is different from the previously set size of the recording medium accommodated in the recording medium accommodation portion 28-1 is performed by comparing the sizes. That is, step S28 constitutes a comparison portion that compares the previous size of the recording medium with the current size of the recording medium on a condition that the recording medium accommodation portion 28-1 is not open between the previous printing and the current printing. The previous size of the recording medium is acquired by referring to previous size information about the recording medium that is updated in step S12 and stored in the storage device 96.

In step S30, in a case where a determination that both sizes are not different, that is, the same, is made, the process is finished. Meanwhile, in step S30, in a case where a determination that both sizes are different is made, a transition is made to step S32. In step S32, output indicating size inconsistency is performed. For example, the output indicating size inconsistency is displayed on the display and operation portion 26 or displayed on the display device 36 of the terminal apparatus 34.

In step S30, while a determination as to whether or not the previous size of the recording medium is the same as the current size of the recording medium is performed, the sizes are not necessarily identical in a strict sense. In the image forming apparatus 10, the paper jam does not occur even in a case where the set size of the recording medium is inconsistent with the size of the actually supplied recording medium in a strict sense. Thus, an allowable value may need to be set for the size of the recording medium.

Figure 8:
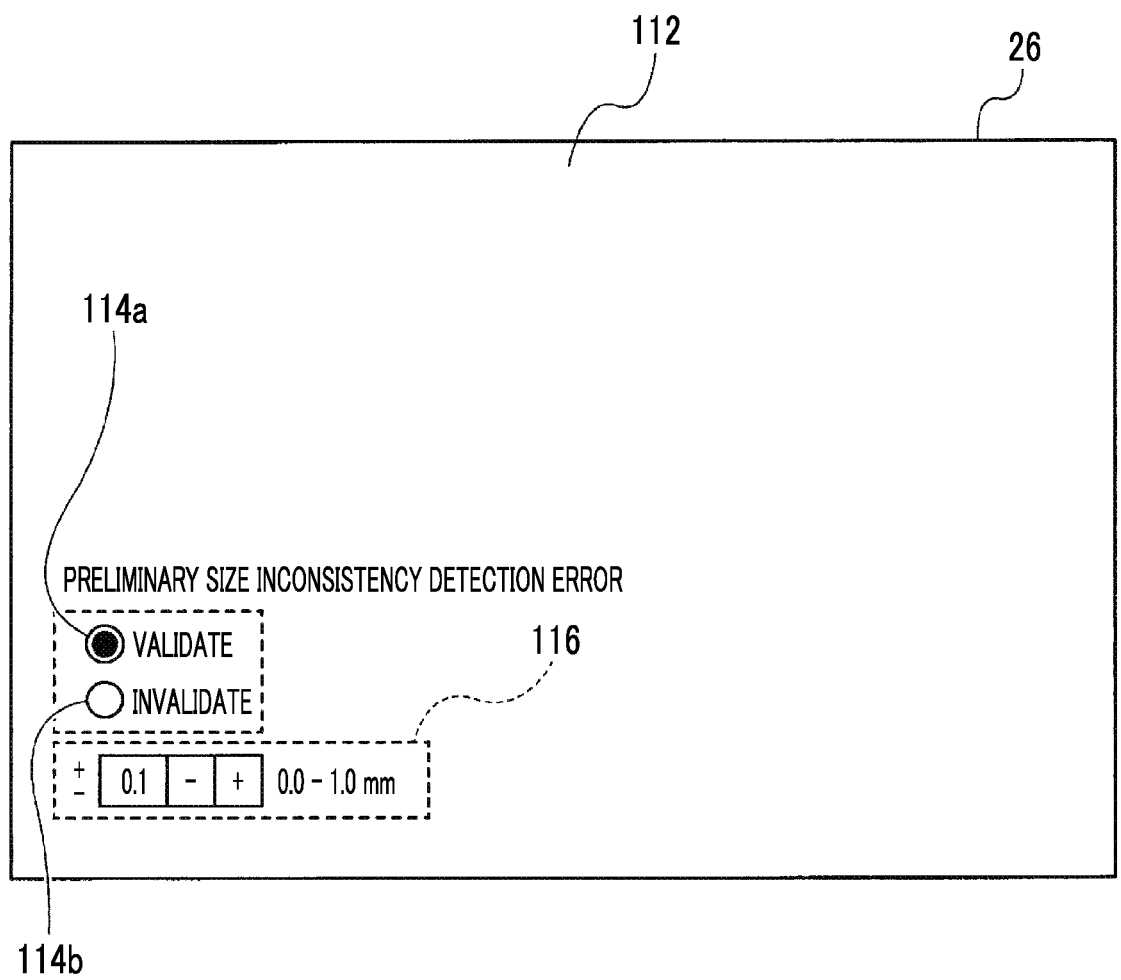
FIG. 8 is a screen view illustrating a display and operation screen for providing an allowable value as a size of the recording medium in the image forming apparatus according to the exemplary embodiment.

FIG. 8 illustrates a display and operation screen 112 of the display and operation portion 26 for providing the allowable value for the size of the recording medium. Options 114a and 114b for selecting whether to validate or invalidate a preliminary size inconsistency detection error are provided on the display and operation screen 112. By selecting the option 114a for validation, the detection error is set to be allowed. In addition, an allowable value setting portion 116 for setting the allowable value is provided below the option 114b. For example, 0.1 mm to 1.0 mm can be set in the allowable value setting portion 116.

Figure 9:
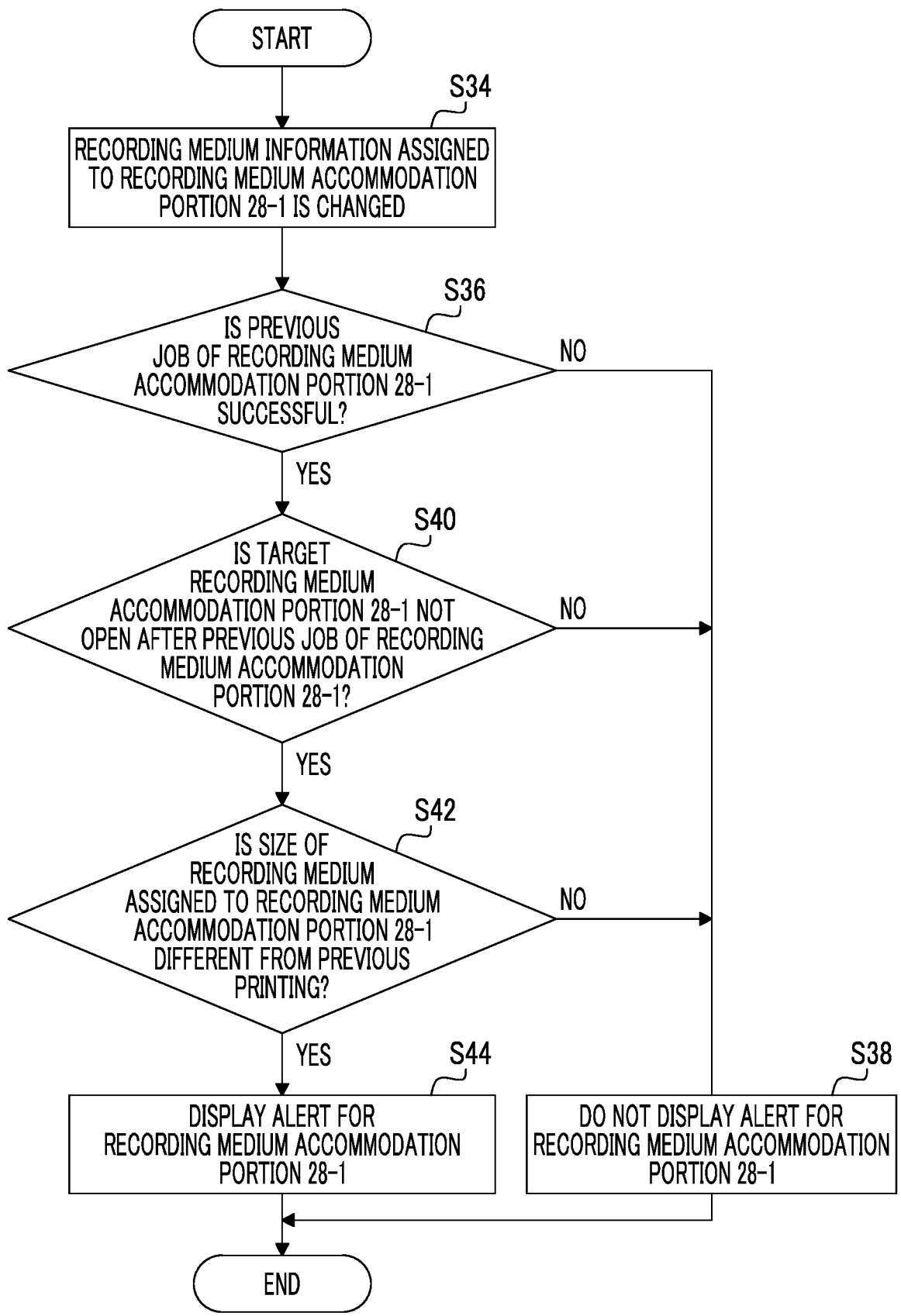
FIG. 9 is a flowchart illustrating a flow of operation in a case where recording medium information assigned to the accommodation portion is changed in the image forming apparatus according to the exemplary embodiment.

FIG. 9 illustrates a flowchart in a case where recording medium information about the recording medium accommodation portion is changed.

This another exemplary embodiment is applied to an image forming apparatus in which the size information about the recording medium can be set in advance for each recording medium accommodation portion.

In step S34, in a case where an assumption that the recording medium information assigned to the recording medium accommodation portion 28-1 is changed is made, a determination as to whether or not the previous job of the recording medium accommodation portion 28-1 is successful is performed in next step S36. In step S36, in a case where a determination that the previous job of the recording medium accommodation portion 28-1 is unsuccessful, a transition is made to step S38. The alert for the recording medium accommodation portion 28-1 is not displayed, and the process is finished. Meanwhile, in step S38, in a case where a determination that the previous job of the recording medium accommodation portion 28-1 is successful is made, a transition is made to step S40.

In step S40, a determination as to whether or not the recording medium accommodation portion 28-1 is not open after the previous job of the recording medium accommodation portion 28-1 is performed. In step S40, in a case where a determination that the recording medium accommodation portion 28-1 is open after the previous printing is made, a transition is made to step S38. Meanwhile, in step S40, in a case where a determination that the recording medium accommodation portion 28-1 is not open after the previous printing is made, a transition is made to step S42.

In step S42, a determination as to whether or not the currently set size of the recording medium accommodated in the recording medium accommodation portion 28-1 is different from the previously set size of the recording medium accommodated in the recording medium accommodation portion 28-1 is performed by comparing the sizes. That is, step S40 constitutes the comparison portion that compares the previous size of the recording medium with the current size of the recording medium on a condition that the recording medium accommodation portion 28-1 is not open between the previous printing and the current printing.

In step S42, in a case where a determination that both sizes are not different, that is, the same, is made, a transition is made to step S44. In step S44, in a case where a determination that both sizes are different is made, the alert indicating size inconsistency is displayed.

The same process is performed for the recording medium accommodation portions 28-2, 28-3, and 28-4 other than the recording medium accommodation portion 28-1.

Figure 10:
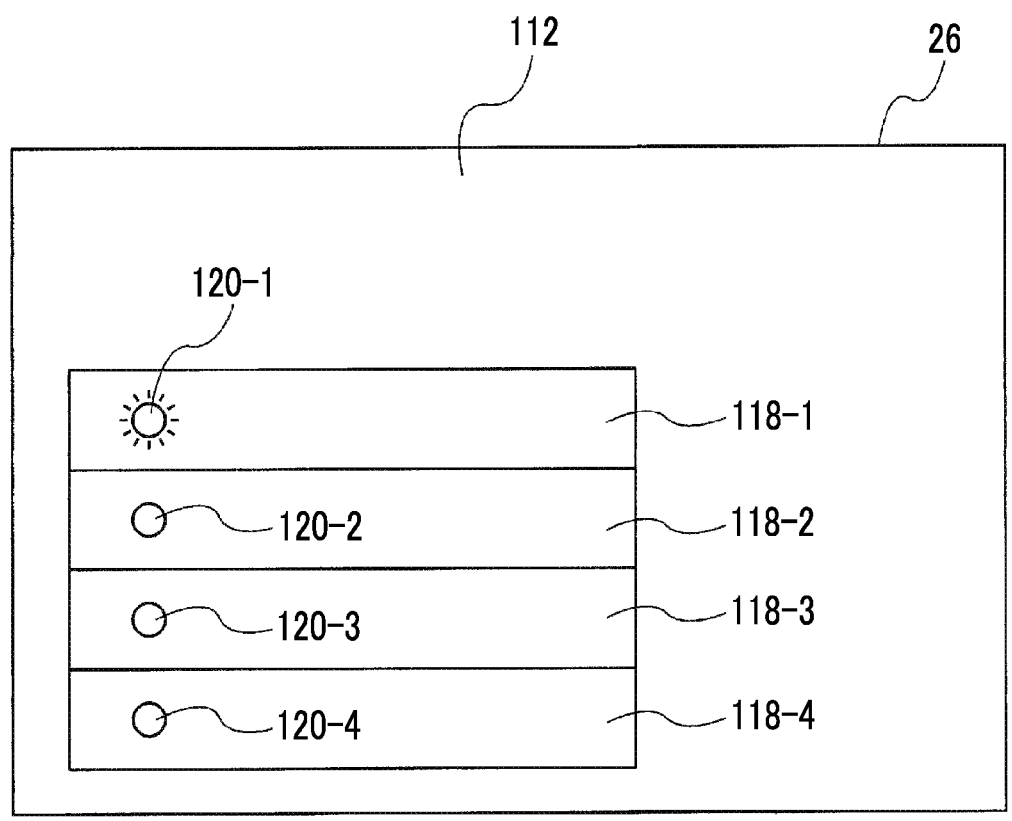
FIG. 10 is a screen view illustrating the display and operation screen displaying the alert in the image forming apparatus according to the exemplary embodiment.

FIG. 10 illustrates an example of displaying the alert of size inconsistency on the display and operation portion 26. Accommodation portion images 118-1 to 118-4 corresponding to the recording medium accommodation portions 28-1 to 28-4 are displayed on the display and operation screen 112 of the display and operation portion 26. Alert display portions 120-1 to 120-4 are provided in the accommodation portion images 118-1 to 118-4, respectively. In a case where the size of the recording medium of the recording medium accommodation portion 28-1 is inconsistent, the alert display portion 120-1 is lit or blinks. The alert display portions 120-2 to 120-4 of the other recording medium accommodation portions 28-2 to 28-4 are not lit.

In the other exemplary embodiment, while the size of the recording medium is changed in the image forming apparatus 10, the size of the recording medium may be changed in the terminal apparatus 34.

In addition, in the two exemplary embodiments, while information about the recording medium is the size information about the recording medium, the information about the recording medium is not limited thereto and includes the thickness, the color, the paper quality, the accommodation direction, and the like of the recording medium.

In addition, the alert display may vary depending on the information about the recording medium. An output form may be separated as follows. In a case where the size or the thickness of the recording medium is different, there is a concern of the paper jam. Thus, display indicating the concern of the paper jam is performed. In a case where the color, the paper quality, or the accommodation direction of the recording medium is different, the concern of the paper jam is small, and display indicating that a recording medium different from the previous printing is accommodated in the recording medium accommodation portion is performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a recording medium accommodation portion that accommodates a recording medium;
   a storage portion that stores information about the recording medium that is accommodated in the recording medium accommodation portion and previously printed;
   a sensing portion that senses opening and closing of the recording medium accommodation portion;
   a comparison portion that compares currently set setting information about the recording medium with the information about the recording medium stored in the storage portion on a condition that the sensing portion senses that the recording medium accommodation portion is not open between previous printing and current printing; and
   an output portion that outputs a comparison result of the comparison portion.

2. The image forming apparatus according to claim 1, wherein the storage portion includes a size of the recording medium as the information about the recording medium, and the comparison portion compares a currently set size of the recording medium with the size of the recording medium stored in the storage portion.

3. The image forming apparatus according to claim 2, wherein the comparison is performed based on whether or not a difference between the currently set size of the recording medium and the stored size of the recording medium falls within a predetermined allowable value range.

4. The image forming apparatus according to claim 1, wherein the storage portion includes at least one of an accommodation direction, a thickness, a color, or a paper quality of the recording medium as the information about the recording medium, and the comparison portion compares at least one of the currently set accommodation direction, thickness, color, or paper quality of the recording medium with corresponding at least one of the accommodation direction, the thickness, the color, or the paper quality of the recording medium stored in the storage portion.

5. The image forming apparatus according to claim 1, wherein the comparison portion performs the comparison in a case where printing of the recording medium is set.

6. The image forming apparatus according to claim 2, wherein the comparison portion performs the comparison in a case where printing of the recording medium is set.

7. The image forming apparatus according to claim 3, wherein the comparison portion performs the comparison in a case where printing of the recording medium is set.

8. The image forming apparatus according to claim 4, wherein the comparison portion performs the comparison in a case where printing of the recording medium is set.

9. The image forming apparatus according to claim 5, wherein the comparison portion performs the comparison in a case where a printing instruction for the recording medium is received.

10. The image forming apparatus according to claim 6, wherein the comparison portion performs the comparison in a case where a printing instruction for the recording medium is received.

11. The image forming apparatus according to claim 7, wherein the comparison portion performs the comparison in a case where a printing instruction for the recording medium is received.

12. The image forming apparatus according to claim 8, wherein the comparison portion performs the comparison in a case where a printing instruction for the recording medium is received.

13. The image forming apparatus according to claim 5, wherein the comparison portion performs the comparison in a case where printing data including the setting information about the recording medium is received.

14. The image forming apparatus according to claim 6, wherein the comparison portion performs the comparison in a case where printing data including the setting information about the recording medium is received.

15. The image forming apparatus according to claim 7, wherein the comparison portion performs the comparison in a case where printing data including the setting information about the recording medium is received.

16. The image forming apparatus according to claim 8, wherein the comparison portion performs the comparison in a case where printing data including the setting information about the recording medium is received.

17. The image forming apparatus according to claim 1, wherein the comparison portion performs the comparison in a case where an instruction to change the recording medium is received.

18. The image forming apparatus according to claim 1, wherein the output portion performs the output by separating an output form between a case where a concern that a jam of the recording medium occurs is present, and a case where the concern that the jam of the recording medium occurs is not present and the information about the recording medium is inconsistent.

19. An image forming method comprising:
accommodating a recording medium in a recording medium accommodation portion;
storing information about the recording medium that is accommodated in the recording medium accommodation portion and previously printed;
sensing opening and closing of the recording medium accommodation portion;
comparing currently set setting information about the recording medium with the stored information about the recording medium on a condition that the sensing indicates that the recording medium accommodation portion is not open between previous printing and current printing; and
outputting a comparison result of the comparing.

20. A non-transitory computer readable medium storing an image forming program causing a computer to execute a process comprising:
accommodating a recording medium in a recording medium accommodation portion;
storing information about the recording medium that is accommodated in the recording medium accommodation portion and previously printed;
sensing opening and closing of the recording medium accommodation portion;
comparing currently set setting information about the recording medium with the stored information about the recording medium on a condition that the sensing indicates that the recording medium accommodation portion is not open between previous printing and current printing; and
outputting a comparison result of the comparing.

* * * * *